United States Patent
Kurylko et al.

(10) Patent No.: US 11,349,829 B2
(45) Date of Patent: May 31, 2022

(54) SYSTEMS AND METHODS FOR USE IN VERIFYING NETWORK IDENTITIES

(71) Applicant: MASTERCARD INTERNATIONAL INCORPORATED, Purchase, NY (US)

(72) Inventors: Marek Kurylko, Bloomfield, NJ (US); Eugene Reda, Little Falls, NJ (US); Skyler Fox, Park Ridge, NJ (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 287 days.

(21) Appl. No.: 16/680,142

(22) Filed: Nov. 11, 2019

(65) Prior Publication Data
US 2021/0144134 A1    May 13, 2021

(51) Int. Cl.
*H04L 9/40* (2022.01)

(52) U.S. Cl.
CPC ........ *H04L 63/083* (2013.01); *H04L 63/0853* (2013.01); *H04L 63/0869* (2013.01); *H04L 63/102* (2013.01); *H04L 63/20* (2013.01)

(58) Field of Classification Search
CPC .............. H04L 63/083; H04L 63/0853; H04L 63/0869; H04L 63/102
USPC ........................................................ 726/5
See application file for complete search history.

(56) References Cited

U.S. PATENT DOCUMENTS

| | | | |
|---|---|---|---|
| 10,992,657 B1* | 4/2021 | Stevens | H04L 63/102 |
| 2006/0016877 A1 | 1/2006 | Bonalle et al. | |
| 2008/0049983 A1 | 2/2008 | Miller et al. | |
| 2015/0332273 A1 | 11/2015 | Bruno | |

OTHER PUBLICATIONS

"Your Heartbeat May Soon Be Your Only Password"; https://www.wired.com/insights/2014/06/heartbeat-may-soon-password/; 2014; 9 pgs.
"What is my cardio fitness score?"; https://help.fitbit.com/articles/en_US/Help_article/2096; Mar. 7, 2019; 7 pgs.
"B-Secur launches algorithms for EKG authentication and wellness monitoring"; www.BiometricUpdate.com; Jan. 7, 2019; 5 pgs.
(Continued)

*Primary Examiner* — Anthony D Brown
(74) *Attorney, Agent, or Firm* — Harness, Dickey & Pierce, P.L.C.

(57) ABSTRACT

Systems and methods are provided for use in verifying network identities. One exemplary method includes receiving, at a computing device, data associated with multiple user devices of a user and relating to one or more identity attributes of the user. The method then includes, in response to a request for authentication of the user, generating an aggregate score based on multiple of a reliability sub score, a length of relationship sub score, and a historical consistency sub score for each of the multiple user devices taking into account at least some of the received data. The aggregate score may then be transmitted to a relying party in response to the request, thereby permitting the relying party to authenticate the user based at least in part on the aggregate score.

17 Claims, 3 Drawing Sheets

(56) References Cited

OTHER PUBLICATIONS

"Multimodal Biometric Identification Using Fingerprint, Face and Iris Recongition"; https://www.researchgate.net/publication/309742836_Multimodal_Biometric_Identification_Using_Fingerprint_Face_and_Iris_Recognition; May 7, 2014; 8 pgs.

"Score Level Fusion for Fingerprint, Iris and Face Biometric"; https://www.researchgate.net/publication/273384020_Score_Level_Fusion_for_Fingerprint_Iris_and_Face_Biometrics; Feb. 2015 (vol. 111—No. 4); 9 pgs.

* cited by examiner

SYSTEMS AND METHODS FOR USE IN VERIFYING NETWORK IDENTITIES

FIELD

The present disclosure generally relates to systems and methods for use in verifying network identities.

BACKGROUND

This section provides background information related to the present disclosure which is not necessarily prior art.

In connection with network interactions by users with different entities, the entities often rely on identities of the users to provide access to content, services, etc. associated with the entities. Prior to granting such access, it is known for the entities to verify the identities of the users, for example, via usernames and passwords, personal identification numbers (PINs), or biometrics, etc. In turn, when the users provide usernames and passwords, or PINs, or biometrics that match corresponding data for the users stored by the entities (or accessible to the entities), the users are verified and the entities provide the requested access to the content, services, etc.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Identities of users may be verified based on a variety of different information. For example, a user's identity may be verified by a driver's license or passport, or by a passcode or even a biometric, etc. When discrete portions or attributes of such identifying information are known to one or more unauthorized users, the unauthorized user(s) may impersonate the user in one or more interactions with a relying party, often resulting in fraud, security breaches, and/or financial loss to the user and/or the relying party, etc. As such, it is problematic when such discrete portions or attributes of the user's identifying information are known to unauthorized users.

Uniquely, the systems and methods herein provide features for protecting identifying information of users by way of an aggregate authentication score. The aggregate authentication score is based on different aspects of user devices associated with a given user (i.e., a variety of data associated with the user), whose identity is to be authenticated. In this manner, a breach of data (or identifying information or data) about the user, for example, a fingerprint, would only provide a limited basis for an unauthorized user to be authenticated as the user. By relying on a variety of data, as well as, for example, a reliability of the given authentication, a length of relationship between the user and the user devices, and a historical consistency of interactions by the user with the user devices, a more arcuate and robust authentication of the user may be provided, to, in part, thwart limited breaches of particular identifying data associated with the user.

Figure 1:
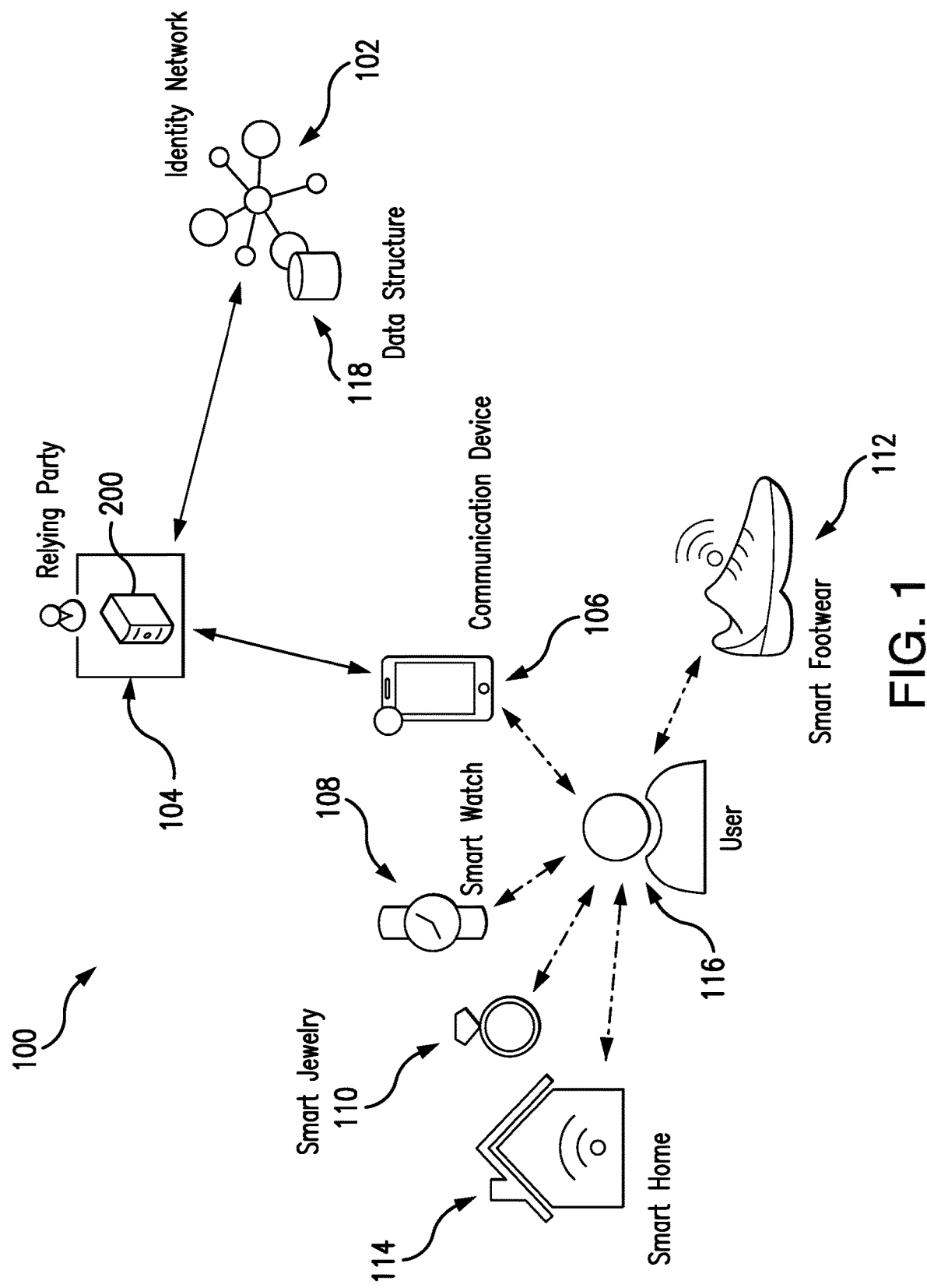
FIG. 1 illustrates an exemplary system of the present disclosure suitable for use in verifying network identities of users as part of interactions by the users with different relying party entities.

FIG. 1 illustrates an exemplary system 100 suitable for use in verifying the identity of users, and in which one or more aspects of the present disclosure may be implemented. Although the system 100 is presented in one arrangement, other embodiments may include the same parts of the system 100 (or other parts) arranged otherwise depending on, for example, privacy concerns, scope and type of identity information, manners and/or types of authentication utilized, numbers of users and/or relying parties, etc.

The system 100 generally includes an identity network 102, a relying party 104, and multiple user devices 106-114 associated with a user 116 (as indicated by the dotted arrows), each of which is coupled in communication through one or more networks (e.g., as represented by the arrowed line between the communication device 106 and the relying party 104, as represented by the arrowed line between the identity network 102 and the relying party 104, etc.). Each of the networks in the system 100 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

In this exemplary embodiment, the identity network 102 may include any entity involved in the verification of identities of users (e.g., through scoring or otherwise, etc.). For example, the identity network 102 may include a payment network, such as, for example, Mastercard, or it may include a non-financial entity, etc. In general, the identity network 102 is configured to expose a service, for example, through an application programming interface (API), a software development kit (SDK), etc., that is, in turn, utilized and/or called by one or more relying parties (such as the relying party 104) to verify an identity of a user (such as the user 116), or at least score (or otherwise evaluate) available identity information about the user relative to a specific identity.

The relying party 104 in the system 100 includes a party or entity relying on an identity of the user 116 to perform some task and/or facilitate some transaction and/or provide some service. In various embodiments described herein, the relying party 104 may include a banking institution or a merchant, whereby it is advantageous for the relying party 104 to verify the identity of the user 116 to ensure he/she is an authorized user to interact with the relying party 104 in the manner requested (e.g., to access an account at the banking institution, to apply for credit at the merchant, etc.). Often, as here, the relying party 104 is configured to expose one or more interfaces to the user 116, via a network-based application, website, etc., whereby the user 116 interacts with the relying party 104 (e.g., via the communication device 106, etc.). The interaction may include both an assertion of an identity of the user 116 and other interactions that, at least in part, rely on the identity of the user 116 to complete or perform. For example, as indicated above, the relying party 104 may include a banking institution, and the interactions may be associated with opening a new account and/or using the account. In another example, the relying party 104 may include a merchant, at which the user 116 is attempting to fund a transaction using a payment account tied to his/her identity. In further embodiments, the relying party 104 may include a service provider (e.g., a mobile network operator (MNO), a media and/or cable provider, a streaming service provider, a home service or utility provider, etc.), at which the user 116 is attempting to set up and/or modify an account for service, or the relying party 104 may be associated with a secure communications platform in which the user 116 is required to prove their identity to send or read messages, or the relying party 104 may be associated with a smart home device (e.g., a connected door lock or alarm system, etc.) to which the user desires access, etc. It should be appreciated, of course, that other relying parties may be included in other embodiments, in which the relying parties rely on an identity of the user 116, for example, directly or indirectly, in connection with one or more interactions with the user 116.

Further, the user devices 106-114 in the system 100 include a variety of different devices associated with the user 116. As shown, for example, the user device 106 includes a communication user device, which may include, without limitation, a smartphone, a tablet, etc., whereby the communication device 106 is a portable communication device, such that it may be carried with the user 116 when the user 116 moves from location to location (although this is not required in all embodiments). That said, it should be appreciated that the communication device 106 may instead include a workstation computing device that is more static to the user's place of residence, work, etc. The user device 108 includes a smart watch device, which may include, for example, a fitness tracker, etc., and the user device 110 includes a smart jewelry device, such as, for example, a smart ring, etc. Each of the smart watch device 108 and the smart jewelry device 110 is configured to capture biometric data associated with the user 116, including, for example, data for his/her heartrate, steps, stride, gait, activity level, stairs, etc. The user device 112 includes a smart footwear device, which is also configured to capture biometric data, such as, for example, data for the user's heartrate, steps, pressure, stride, gait, activity level, stairs, etc. It should be appreciated that each of the user devices 106-122 may be further configured to capture location data for the user 116 (e.g., may be GPS enabled, etc.).

The user device 114 includes a smart home device, which is associated with the user 116 and further is associated with a premises (not shown) that may be a residence, workplace, or other place associated with the user 116 (and which may include various additional user devices). The smart home device 114 may include a home security camera (or doorbell camera) as part of a security system, a doorbell camera (or video doorbell) as part of a smart door lock, a smart light, a smart refrigerator, or other device suitable for use at the premises, where the various devices (or underlying services associated therewith) may potentially be provided to the user 116, for example, by a relying party as described herein (e.g., the relying party 104, etc.). For example, a doorbell camera user device at the smart home device 114 may be configured to capture an image of the user's face, whereby if the user's face is recognized by the doorbell camera, a relying party associated with the smart door lock and/or security system is able to disable an alarm and unlock the door to provide access to the user 116 to the smart home device 114. As another example, the smart home device 114 (e.g., by way of one or more of the other user devices at the smart home device 114, etc.) may be configured to capture data for alarm system activities (e.g., arm, disarm, enter, exit, etc. information), voice biometrics, facial images, etc. associated with the user 116 or others at the smart home device 114. Again, such data may be used to allow access by the user 116 (or others) to the smart home device 114 (by way of an interaction with the relying party 104 or another relying party), or to allow modification of lighting at the smart home device 114 (by way of smart lights, etc.), a temperature at the smart home device 114 (by way of smart thermostats, etc.), etc. It should be appreciated that while several exemplary user devices are disclosed and described herein, other user devices may be included in other system embodiments. For example, a smart glove or smart eyewear (e.g., Google Glass™ device, etc.), worn by the user 116, may be configured to, among other things, capture biometric data such as, for example, data for the user's heartrate, iris, face, or fingerprints, etc.

Whether specifically illustrated in FIG. 1, or not, the user devices 106-114 (and other potential user devices) are each configured to capture data, specific to the user 116, and to transmit the captured data to the identity network 102, along with an indication of the user 116. The indication of the user 116 may be an identifier specific to the user 116, or potentially an identifier specific to the user device that captured and transmitted the data whereupon the user device is then otherwise identified to the user 116, etc. It should be appreciated that the user devices 106-114, in some embodiments, may be configured to capture and transmit data related to other users, for example, depending on the specific users for the device, etc.

While only one identity network 102, one relying party 104, and one of each of the user devices 106-114 are illustrated in FIG. 1, it should be appreciated that any number of these features may be included in the system 100, or may be included as parts of systems in other embodiments, consistent with the present disclosure. Likewise, it should be appreciated that the system 100 is not limited to only one user 116 as numerous users (and associated user devices) will likely be included in various implementations of the systems and methods described herein.

Figure 2:
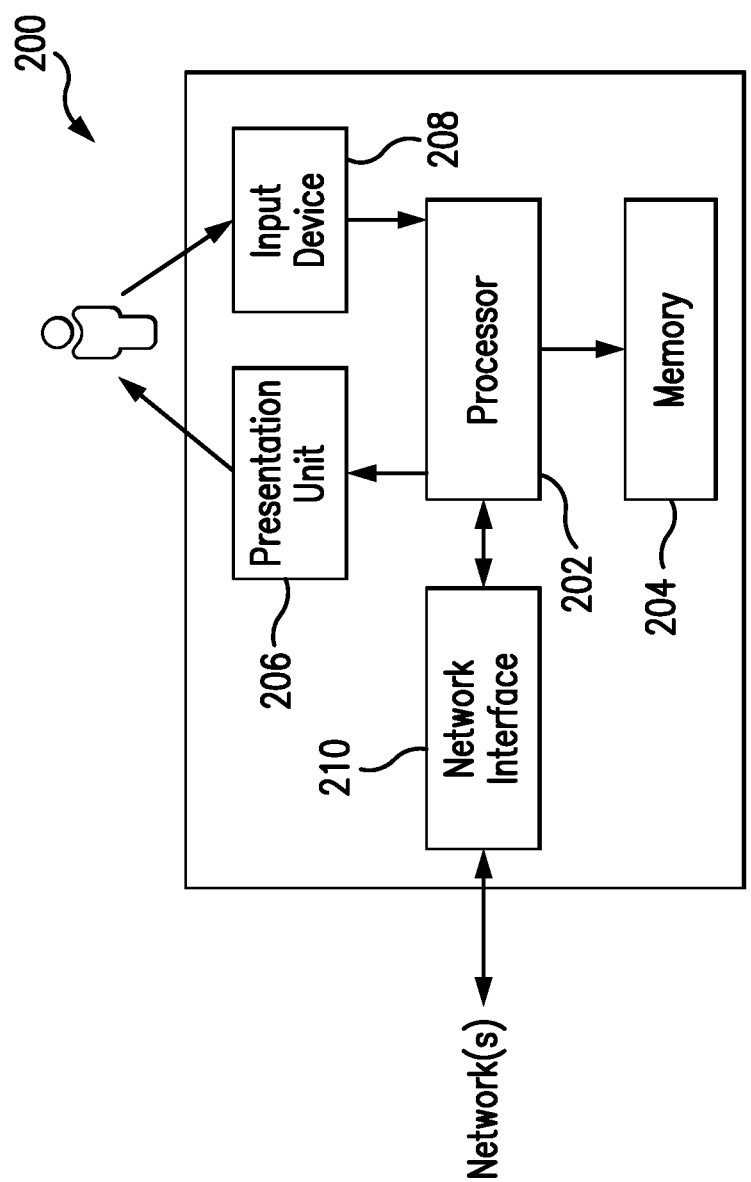
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, smart devices, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the identity network 102, the relying party 104, the communication device 106, and the other devices 108-114 may include and/or may be integrated into and/or may be implemented in a computing device similar to (and generally consistent with) the computing device 200. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identifying data for users, identities for users, data relating to such identities, data relating to user devices, and/or other types of data (and/or data structures) suitable for use as described herein.

Furthermore, in various embodiments, computer-executable instructions may be stored in the memory 204 for execution by the processor 202 to cause the processor 202 to perform one or more of the functions described herein (e.g., one or more of the operations described in method 300, etc.), such that the memory 204 is a physical, tangible, and non-transitory computer readable storage media. Such instructions often improve the efficiencies and/or performance of the processor 202 and/or other computer system components configured to perform one or more of the various operations herein, whereby the instructions effectively transform the computing device 200 into a special purpose device. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information (e.g., requests for identifying information, data relating to requested services, etc.), visually, for example, to a user of the computing device 200, such as the user 116 in the system 100, etc. And, various interfaces (e.g., as defined by network-based applications, etc.) may be displayed at computing device 200, and in particular at presentation unit 206, to display certain information. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) such as, for example, inputs by the user 116 to the communication device 106 or to other ones of the devices 108-114, etc. The input device 208 may include a single input device or multiple input devices. The input device 208 is coupled to (and is in communication with) the processor 202 and may include, for example, one or more of a keyboard, a pointing device, a mouse, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC™) adapter, a Bluetooth™ adapter, etc.), a mobile network adapter, or other device capable of communicating to one or more different networks in the system 100. Further, in some exemplary embodiments, the computing device 200 may include the processor 202 and one or more network interfaces incorporated into or with the processor 202. In various embodiments, the computing device 200 may also include global positioning system (GPS) capability whereby the computing device 200 may determine its current geographic location, etc. For example, various ones of the user devices 106-114 may include network interfaces 210, which enable location data to be provides as GPS capability and/or network triangulation capability to determine and transmit a location of the user 116.

Referring again to FIG. 1, the identity network 102 of the system 100 includes an identity data structure 118, which includes various forms of identifying (or identity) data for the user 116 and multiple other users, for example, based on registration of the user 116 and other users with the identity network 102, etc. The identity data structure 118 may be included, for example, in a memory (e.g., the memory 204, etc.) of the identity network 102. Alternatively, in other embodiments, the identity data structure 118 may be separate from the identity network 102 and accessible thereto.

The identity network 102 is configured to receive identity data for the user 116 from each of the user devices 106-114, either directly or indirectly via another entity or device, whereby the identity data is identified to the user 116 and/or the user device from which the data is received (e.g., based on prior registration of the user 116 with the identity network 102, based on recognition of the user 116 from the device, etc.). In connection therewith, one or more of the devices 106-114 may be configured to report or "push" data to the identity network 102 at set intervals or as the data is recorded or becomes available. Alternatively, one or more of the devices 106-114 may be configured to wait to provide any such data until the identity network 102 "pulls" the data from the given device (e.g., during an authentication event, at set intervals, etc.) (such that, in some embodiments, the identity network 102 is configured to pull the identity data from one or more of the devices 106-114, as desired). Regardless, upon receipt of the identity data, at the identity network 102, the identity network 102 is configured to store the identity data in the identity data structure 118 and to organize the data according to the user 116 (and/or the particular one of the user devices 106-114 from which it was received), as part of a profile for the user 116. The identity data may be captured at one or more intervals, regular or irregular, and/or may be based on one or more events associated with the user 116 (e.g., one or more authentication events associated with the user 116, etc.), the particular one of the user devices 106-114 from which the identity data is received, or even the relying party 104, etc.

Table 1 illustrates an exemplary segment of identity data that may be included in the identity data structure 118 for the user 116. As shown, by way of the identity data in the data structure 118, the data structure 118 generally includes the profile for the user 116 and associated devices 106-114.

TABLE 1

| Device | Fingerprint data | Facial recognition data | Location data (historical, current) | Passcode |
|---|---|---|---|---|
| 106 | | | | |
| Device 108 | Heart rate data (historical, current) | Walking pace (historical, current) | Heart rate variability (HRV) (historical, current) | Body temperature (trend, current) |
| Device 110 | Heart rate data (historical, current) | Heart rate variability (HRV) (historical, current) | Body temperature (trend, current) | Sleep patterns (historical, trend) |
| Device 112 | Walking pace/ rhythm (historical, current) | Stride analysis (historical, current) | Lateral gait analysis (historical, current) | Step pressure (historical, trend, current) |
| Device 114 | Facial/body recognition data | Alarm system codes, arm/disarm/sensor pattern analysis | Voice recognition data | Smart lock physical key sensor (present, not present) |
| ... | ... | ... | ... | ... |

As described above, the identity data may be pushed from the user devices 106-114 to the identity network 102, for example, via an API and/or an SDK included in an application installed and active in the user devices 106-114, etc. Alternatively, or additionally, the identity data may be pulled by the identity network 102, from the user devices 106-114, for example, via an API and/or an SDK included in the application installed and active in the user devices 106-114, etc.

That said, in connection with an interaction between the relying party 104 and the user 116, via one or more interfaces associated with the relying party 104 (e.g., at the user's communication device 106, etc.), the user 116 submits identity data upon which the relying party 104 is permitted to verify the user's identity. Apart from a name, an identifier (e.g., a username, a passcode, a PIN, etc.), a biometric, or the like, the relying party 104 may also be configured to capture an identifier associated with the communication device 106, through which the user 116 is interacting with the relying party 104. In response, the relying party 104 is configured to submit, for example, via an API, SDK, or otherwise, a request to the identity network 102 to verify the user 116. The request may include, for example, the identity data provided by the user 116 and additional data related to the user 116 and/or the communication device 106 (e.g., a MAC address, an electronic identification number (EIN), a phone number, etc.).

The identity network 102, in turn, is configured to receive the request and to generate an aggregate identity score for the user 116 base on the information included in the request. In particular, the identity network 102 is configured to identify the different accessible or available devices for the user 116, such as, for example, the user devices 106-114. Then, for each of the identified user devices 106-114, the identity network 102 is configured to calculate three sub scores: a general reliability sub score, a length of relation sub score, and a historical consistency sub score. The general reliability sub score is based on the linking between the particular user device and the user 116 and is indicative of the reliability of the given device in identifying the user 116. As such, for example, a fingerprint functionality of the particular user device may provide one score when the user 116 is verified, while a gait sensor functionality of the same user device may provide another score when the user 116 is verified (depending on how accurate or reliable the fingerprint functionality and the gait sensor functionality are for the given device). The sub score may also be based on the type of verification and also the degree of verification (e.g., the confidence in the verification, etc.). The length of relation sub score is a numeric representation of the length of the relation between the user device and the user 116 (e.g., each interval of relation counts for X points, etc.), and the historical consistency sub score is based on interaction between the user 116 and the user device. For example, the historical consistency sub score may be one value when the user 116 has logged into the user device a certain number of times with a certain number of failed logins.

Next in the system 100, the identity network 102 is configured to combine the sub scores for each user device and to then combine the scores for the separate user devices, thereby arriving at an aggregate score. The identity network 102 is configured to then determine whether the aggregate score satisfies a threshold and, when it does satisfy the threshold, transmit the aggregate score or a verification indicator associated therewith back to the relying party 104 in response to the request. In turn, the relying party 104 may be configured to respond to the user 116 as appropriate. It should be understood that in connection with transmitting the aggregate score to the relying party 104, the identity network 102 may be configured to modify (or adjust) the aggregate score, for example, to a specific industry of the relying party 104 (i.e., an industry standard value), etc.

It should also be appreciated that the request from the relying party 104 may be provided in a number of different forms. In the exemplary embodiment of FIG. 1, the request is included in connection with enhanced authentication, and in particular, 3D Secure authentication, where the aggregate score is considered by an access control server (ACS) or even a directory server, as part of a verification request and/or a verification response (e.g., as part of the authentication step up requirements, as part of an accountholder authentication value (AAV), etc.).

Figure 3:
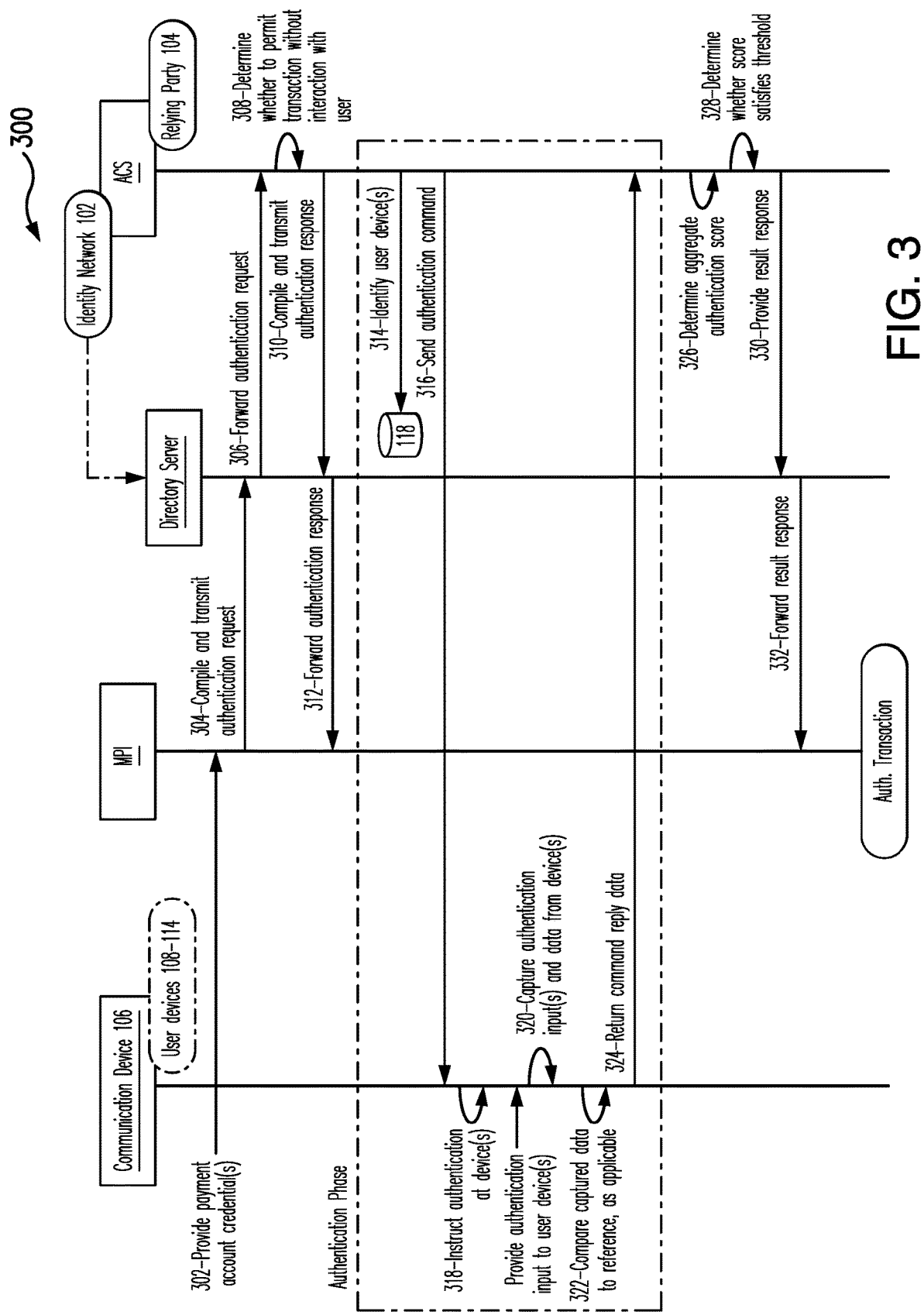
FIG. 3 is a flow diagram of an exemplary method, which may be implemented in connection with the system of FIG. 1, for verifying an identity of a user prior to permitting access, by the user, to content, services, etc., provided by a relying party.

FIG. 3 illustrates an exemplary method 300 for verifying a user in connection with an interaction by the user with a relying party. The exemplary method 300 is described as implemented generally in the system 100 of FIG. 1. The method 300 is also described with reference to the computing device 200 of FIG. 2. That said, however, the methods herein should not be understood to be limited to the system 100 or the computing device 200, as the methods may be implemented in other systems and/or computing devices. Likewise, the systems and the computing devices herein should not be understood to be limited to the exemplary method 300.

At the outset, in addition to the system 100, the method 300 is described with reference to a merchant, a merchant plugin (MPI) associated with the merchant, a directory server (associated with a payment network (e.g., Mastercard® payment network, etc.)), and an ACS associated with a payment account issuer, which are all configured to conform to the EMV 3D Secure™ specification for providing such enhanced authentication techniques (and all of which may be consistent with and/or implemented in a computing device consistent with computing device 200). That said, it should be appreciated that in other embodiments, the system 100 and method 300 herein may be configured to conform, in whole or in part, to another standard for providing enhanced authentication techniques (e.g., a standard other than the 3D Secure™ specification standard, etc.) within the scope of the present disclosure.

In this embodiment (as shown in FIG. 3), the identity network 102 is illustrated as part of the ACS (e.g., as part of the payment network including the ACS, etc.), but may also be part of the directory server (as indicated by the dotted line). Alternatively, the identity network 102 may be independent of the directory server and/or the ACS and offered, for example, as a service to the directory server and/or the ACS, whereby the directory server and/or the ACS would direct a request to the identity network 102 consistent with the description of FIG. 1. Regardless of the arrangement, though, the identity network 102 (and its associated components) will still capture the data from the various user devices 106-114 associated with the user 116 (and store the same in the data structure 118, for example, as shown in Table 1, etc.). That said, in scenarios where the identity network 102 is integrated with the ACS, the ACS (as a component of the identity network 102) may then be configured to gather the data from the user devices 106-114. Alternatively, in scenarios where the identity network 102 is separate from the ACS, for example, incorporated on the user's communicating device 106 or on a cloud server, etc., the device 106 or the server, etc. where the identity network 106 is operating is configured to gather the data from the user devices 106-114. Also in this embodiment, the relying party 104 is included in the ACS, but may further or separately form part of the issuer of the user's payment account used in the transaction illustrated in FIG. 3, whereby certain operations would be performed by the issuer. In general, though, the issuer may be viewed as the relying party 104 in the example of FIG. 3.

Apart from the above, in general in the method 300 of FIG. 3, the user 116 is associated with the different user devices 106-114, which are used and/or carried with the user 116 as appropriate. Consequently, the data structure 118 is populated with data received and/or derived therefrom (as generally described above in the system 100).

In the method 300, when the user 116 decides to purchase a product from the merchant, the user 116 initiates an online transaction, for example, via the communication device 106. In connection therewith, the user 116 provides, at 302, one or more payment account credentials to the merchant (via a virtual location or website associated with the merchant) either from the communication device 106 (e.g., via a virtual wallet therein, etc.), from a physical card associated with the payment account, or otherwise, etc. The payment account credential(s) may include, for example, the PAN for the consumer's payment account, the expiration date, the CVC associated with the user's card, etc.

Because the merchant is enrolled for enhanced authentication in this example (e.g., consistent with the 3D Secure specification, etc.), in response to the payment account credential(s) provided by the user 116, the transaction is passed from the merchant to the MPI, whereby the MPI compiles and transmits, at 304, an authentication request (AReq) for the transaction to the directory server. The AReq includes details of the purchase and of the credential(s) provided by the user 116 (in whole or in part). The directory server, in turn, identifies the respective ACS for the issuer of the user's payment account (i.e., the issuer of the user's payment account to which the transaction is directed based on the credential(s) provided by the user 116, etc.) and forwards the AReq to the ACS, at 306.

Upon receipt of the AReq, and in response thereto, the ACS determines, at 308, whether the transaction should be permitted without additional interaction with the user 116, or not. This is determined through a risk assessment of the transaction, which is based on risk factors associated with the transaction (e.g., transaction amount, transaction history, merchant identifiers, merchant type, time of day, fraud scoring, etc.). Upon determining that an interaction or challenge question to the user 116 is necessary or desired (based on the risk assessment (e.g., based on a generally higher risk assessment, etc.)), the ACS implements an authentication process for the user 116. In particular, the ACS compiles and transmits, at 310, an authentication response (ARes) to the directory server 118, which then forwards, at 312, the ARes to the MPI. The ARes includes a network address that may be called by the MPI to cause a message to display at the virtual merchant location (of the merchant), for example, via the communication device 106 of the user 116 (which is being used in this example to view the virtual location of the merchant to effect the purchase transaction), informing the user 116 to authenticate himself/herself at the communication device 106 (and, potentially, at another one of the user devices 108-114), for example (and thereby allowing the user 116 to communicate with the ACS via the communication device 106 (and, potentially, the other identified device(s) (e.g., based on the prior registration of the device (s) with the identity network 102 whereby they may be known to the ACS (via the data structure 118) when the identity network 102 is integrated with the ACS, or by way of communication between the ACS and identity network 102 in other scenarios, etc.)).

In connection therewith, the ACS, or more specifically, the identity network 102 (as called by the ACS, for example), initiates the device authentication phase for the transaction, as shown in the dotted box in FIG. 3, for each or multiple ones of the registered user devices 106-114. Initially, the authentication phase is described with reference to the communication device 106. However, as indicated by the dotted inclusion of the user devices 108-114, it should be appreciated that this phase may alternatively (or additionally) be directed to or duplicated to the different user devices 108-114 or ones thereof. Specifically, as shown in FIG. 3, the ACS (or the identity network 102) identifies, at 314, one or more of the user devices 106-114 from the user profile for the user 116 included in the data structure 118, based on, at least in part, the credential(s) included in the Areq and/or based on a device ID assigned thereto (e.g., a MIN, an ESN, etc.).

In turn, the identity network 102 transmits, at 316, an authentication command to one or more of the user devices 106-114, including the communication device 106. Upon receipt of the authentication command, the communication device 106 instructs, at 318, the user to authenticate at the communication device 106 (e.g., by providing a biometric (e.g., a fingerprint, facial image, etc.) or a passcode, etc.). In this embodiment, in response, the user 116 provides an authentication input to the communication device 106. In connection therewith, the communication device 106 captures the authentication input (e.g., fingerprint, facial image, passcode, etc.) from the user, at 320, and, optionally, compares, at 322, the captured authentication input to reference data stored in the communication device 106 (e.g., in the memory 204, etc.) in order to authenticate the user 116 (in a generally conventional manner). In various embodiments, upon receipt of the authentication command, the communication device 106 may instruct the user to additionally, or alternatively, authenticate himself/herself at one or more of the other devices 108-114 (which may be in communication with the communication device 106 such that the communication device 106 can then authenticate the user 116 based on the user's input to the one or more of the other devices 108-114). Alternatively, the other devices may be able to communicate directly with the identity network 102 and/or ACS.

When a match is determined for the authentication input (or multiple inputs where such inputs are received from multiple ones of the devices 106-114), the user 116 is authenticated by the communication device 106 and the communication device 106 returns, at 324, a command reply (including a flag indicating the match (or matches), and thereby indicating a successful authentication) to the ACS and/or the identity network 102. In addition, the communication device 106 further returns, as part of the command reply, data associated with the communication device 106, including, among other things, location data, login pass/fail over time data, type of authentication technique (or techniques) employed (i.e., that generated the flag), etc.

Apart from the communication device 106, the identity network 102 may, as part of the authentication phase (and as noted above), transmit, at 316, the authentication command to the other user devices 108-114 (either directly or via the communication device 106). The biometric enabled devices, in this exemplary embodiment, will follow the operation described above. For example, the smart watch device 108 may capture heart rate data, or steps data, etc., as an authentication input, and compare the same to reference data for the user 116 (either itself or via communication with the communication device 106), while the smart jewelry device 110 may do the same. When the command reply is transmitted, it includes not only the result of the authentication matching (or not matching), but also location data, heart rate data, stride data, etc. In at least one embodiment, the identity network 102 may transmit an authentication command to one user device, and then capture authentication data from another user device. For example, the identity network 102 may transmit an authentication command to the communication device 106 to take 15 steps, whereby the identity network 102 will capture data from the footwear user device 112 with regard to the number of steps taken. Further, for the smart home device 114, the identity network 102 may request a facial or voice authentication input, and in a returned command, from the smart home device 114 (e.g., a camera input device at the smart home device 114, etc.), receive a flag for the matching authentication along with alarm system data over an interval.

Next, with further reference to FIG. 3, the identity network 102 determines, at 326, an aggregate score for the user 116 and/or the user devices 106-114 (e.g., based on the data included in the command reply from the communication device 106, or other one of the devices 108-114, etc.). Table 2 illustrates the determination of the aggregate score. As shown, the aggregate score, per user device, includes three sub scores relating to: general reliability, length of relation, and historical consistency.

TABLE 2

| Criteria | General Reliability of match | Length of Relationship | Historical Consistency | Score |
|---|---|---|---|---|
| Maximum Criteria Value | 10 | 5 | 5 | 20 |
| User Device 106 | iPhone ® fingerprint sensor - 7/10 | Over 1 year - 5/5 | 1100 successful readings, 50 failed readings (4.3%) - 3/5 | 15 |
| User Device 112 | Gait Sensor - 3/10 | Less than 3 months - 1/5 | 90 measured gaits match prior readings, 10 measured gaits do not match prior readings (10%) - 3/5 | 7 |
| Aggregate Score | | | | 22 |

The general reliability sub score indicates a reliability of the authentication of the user 116 at the given device. In the above example, this score is assigned based on a range of zero to ten (but could be based on any other desired range) and based on a type of the authentication performed at the device (e.g., fingerprint, facial image, gait, heartbeat, etc.), and also takes into account a type/age of sensor included in the user device (e.g., iPhone® fingerprint sensor versus a Samsung® fingerprint sensor, or 2000 sensor versus a 2019 sensor, etc.). General statistics may be used for the reliability of the type of authentication and/or the type of the sensor in order to provide the score. As shown in Table 2, the authentication of the user 116 at the user device 106 provides as a sub score of seven (based on the iPhone® fingerprint sensor), while the authentication of the user 116 at the user device 112 provides as a sub score of three (based on the specific gait sensor used in the device 112).

The length of relationship sub score is based on a duration of the relationship between the user device and the user 116. Here, the sub score is provided on a scale from zero to five, with the scale further defined for duration of relationship in Table 3.

TABLE 3

| | |
|---|---|
| Over 1 year | 5 |
| 9-2 months | 4 |
| 6-9 months | 3 |
| 3-6 months | 2 |
| Less than 3 months | 1 |

The length (or duration) of the relationship is determined from the data structure 118 based on the data captured from the user device 106 (and from the other devices 108-114), over time, and stored. Alternatively, the user device 106 may provide the duration of relationship in connection with the command reply, as described above. As shown in Table 2 (and as further indicated in Table 3), the relationship between the user 116 and the user device 106 scores as a sub score of five, while the relationship between the user 116 and the user device 112 scores as a sub score of one. That said, other scales for this sub score and of manners of relating the duration of the relationship to the sub score may be employed in other method embodiments.

Finally, the historical consistency sub score is based on interaction between the user 116 and the given user device. In this exemplary embodiment, the historical consistency sub score for the communication device 106 is based on a login history of the user device 106, whereby a percentage of login failures is expressed as a sub score on a scale from zero to five. And, the historical consistency sub score for the user device 112 (e.g., the gait sensor) generally includes an indication of how consistent the gait readings are over time, for example, compared to prior readings, whereby a percentage of inconsistent readings may be expressed as a sub score on a scale of zero to five. Additionally, the historical consistency sub score for ones of the user devices that capture fingerprint data (i.e., that have a fingerprint sensor) may include an indication of successful fingerprint readings versus failed readings, whereby a percentage of failed fingerprint readings versus successful readings may be expressed as sub score on a scale of zero to five. Further, and more generally, the historical consistency sub score may be based on the consistency of complex data and trends across time (whereby the resulting sub score may vary based on the complexity of the underlying data, etc.). In the above example, the relation of the percentage of failed fingerprint readings to the value of the sub score for the given device (based on a fingerprint sensor associated with the given device) is illustrated in Table 4, and the relation of the percentage of inconsistent gait readings to the value of the sub score for the given device (based on gait sensor associated with the given device) is illustrated in Table 5.

TABLE 4

| | |
|---|---|
| Less than 1% | 5 |
| 1.1%-3% | 4 |
| 3.1%-5% | 3 |
| 5.1%-7% | 2 |
| Over 7.1% | 1 |

TABLE 5

| | |
|---|---|
| Less than 4% | 5 |
| 4.1%-8% | 4 |
| 8.1%-12% | 3 |
| 12.1%-16% | 2 |
| Over 16.1% | 1 |

As shown in Table 2, then, the historical consistency of 4.3% for the user device 106 provides a sub score of three, while the historical consistency of 10% for the user device 112 provides a sub score of three. That said, it should again be appreciated that other scales for this sub score and other manners than relating the percentage of login failures or inconsistent readings at a device to the sub score may be employed in other method embodiments. It should also be appreciated that other data (other than a percentage of login failures, other than a percentage of inconsistent readings, etc.) may be relied upon to provide a historical consistency sub score. Additional examples include, for instance, a profile for a number of steps over an interval, a number of arms and disarms of the smart home device 114 (e.g., an alarm system, etc.), historical trends for arm/disarm times on an alarm system at the home device 114 (e.g., when leaving and returning for work each day, etc.), whereby as more consistency is shown over time, or if the user 116 has a particularly high level of consistency in their commuting schedule, this alarm arm/disarm input may get a higher score for historical consistency), a consistency of time between door entry and keypad disarm at the smart home device 114, a step pressure change over time as measured at the smart footwear 112 (e.g., based on weight gain/loss, etc.) (whereby the historical consistency score may be generally higher if the degree of change stays on a predictable trend line, etc.), and a correlation between motion detected by an in-device accelerometer vs. resulting elevation in heart rate as measured by the smart watch device 108 (whereby if this correlation remains consistent (or consistently on a trend line) over time, the user 116 may be identified based on his/her cardiac fitness), etc.

Further, as shown in Table 2, the general reliability sub score is on a scale of up to ten, while the length of relationship sub score and the historical consistency sub score are each on a scale of up to five. In this manner, the general reliability sub score is weighted twice as much as the other sub scores. It should be appreciated that this may be different in other embodiments, depending on, for example, the accuracy and/or reliability of the other sub scores employed. That said, it should be appreciated that the method 300 should not be understood to be limited to the general reliability, length of relationship, and historical consistency sub scores (or the calculations of the same described above) and may instead utilize only one of the sub scores for one device and more sub scores for other devices, or any combination thereof (or different calculations for the same). Different profiles, for example, may give rise to different or additional historical consistency scores, etc., whereby more or less sub scores may be employed in a different aggregate.

After determining each of the sub scores, the identity network 102 combines the sub scores, which, as shown in Table 2, includes summing the sub scores in this exemplary embodiment, to provide an aggregate score of 22. It should be appreciated that the various sub scores may be combined in other manners to achieve the aggregate score in other embodiments. Additionally, or alternatively, multiple elements used in generating one or more of the sub scores may be exposed to the second iteration of the payment service devices (PSD2) strong consumer authentication (SCA) multi-factor authentication (e.g., where authentication of the user 116 may be based on the use of two or more elements categorized as knowledge (or something only the user 116 knows), possession (or something only the user 116 possesses), and inherence (or something the user 116 is or embodies)).

Also in this exemplary embodiment, the identity network 102 further converts the aggregate score into an industry-standard authentication value. For example, where a standard value of 07 indicates that the user is authenticated, the identity network may convert the 22 to 07 when the aggregate score satisfies a threshold, as described below. Otherwise, the identity network 102 may pass the aggregate score, as is, to the ACS.

With reference again to FIG. 3, after the aggregate score is generated, the ACS determines, at 328, whether the aggregate score satisfies a threshold (e.g., a threshold of 20, etc.). If the threshold is satisfied, the ACS generates an authentication code for the authentication of the user 116 and the purchase transaction. Then, whether the threshold is satisfied, or not, the ACS provides a result response, including the authentication code, or not, to the directory server, at 330. The directory server, in turn, forwards the result response to the MPI, at 332. As above, the result response includes, among other things, the authentication code, if applicable, for the purchase transaction by the user 116 (e.g., as part of an AAV representative of the authentication of the user 116, as is conventional and as is consistent with the 3D Secure™ specification; etc.).

Alternatively, rather than compare the aggregate score to a threshold, the ACS may provide the aggregate score as is (or a converted version of the aggregate score) in place of the authentication code, to the directory server in the result response, whereby the directory server may compare the score to a threshold, etc.

In either case, upon receipt of the result response (via the MPI), the merchant compiles and transmits an authorization request for the purchase transaction to an acquirer. The authorization request includes the details of the desired purchase transaction (e.g., a PAN or token for the consumer's payment account, an amount of the transaction, a merchant ID for the merchant, etc.) and further includes the authentication code or the aggregate score provided from the ACS in the authentication response. For example, the aggregate score (or an indicator thereof) may be included in a data element (DE), which is specific to authentication or, potentially, is conventionally unused. As is conventional, the acquirer forwards the authorization request to a payment network, which, in turn, forwards the authorization request to the issuer. The issuer then determines to approve or decline the purchase transaction. The approval may be based in part on the authentication code included in the authorization request. Additionally, or alternatively, the issuer (as the relying party 104) may determine whether the aggregate score satisfies a threshold (e.g., a threshold of 20, etc.). When the threshold is satisfied, the authentication aspect of the approval is also satisfied, whereby the issuer will authorize the transaction when other pieces of the authorization indicate approval (e.g., payment account balance, standing, etc.).

Thereafter, the issuer compiles and transmits an authorization response (or reply) to the payment network. The authorization response includes the details of the transaction along with an indicator of whether the transaction is approved or declined. The authorization response is forwarded, in turn, from the payment network to the acquirer, and is then forwarded from the acquirer to the merchant, whereupon the merchant is able to complete the interaction with the user 116, as appropriate.

In view of the above, the systems and methods herein provide for enhanced authentication of users through use of more complete data related to the user and user devices associated with the user. By doing so, the systems and methods herein hinder fraudsters' ability to spoof the depth and extent of data relied on herein. What's more, when a user device is stolen, a thief may attempt to register new inputs to access an existing account on a stolen device (especially where a passcode has also been stolen). As can be appreciated, newly-configured inputs would have inherently lower levels of confidence versus longstanding ones then based on the length of relationship sub score, for example, thereby rendering the thief's authentication attempts to be of a significantly lower quality than the user 116, for example. Additionally, as devices and authentication systems and methods become broadly compromised, a flexible, composite biometric authentication aggregate score may be adjusted at both the scoring side (discounting compromised methods) and at the consumption side (increasing score thresholds for high-risk activities), thereby providing advantages over static authentication input and values.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, at a computing device, data associated with multiple user devices of a user and relating to one or more identity attributes of the user; (b) in response to a request for authentication of the user, generating an aggregate score based on multiple of a reliability sub score, a length of relationship sub score, and a historical consistency sub score for each of the multiple user devices; (c) transmitting the aggregate score to a relying party in response to the request, thereby permitting the relying party to authenticate the user based at least in part on the aggregate score; (d) determining, by the computing device, the reliability sub score for each of the multiple user devices based on a type of authentication of the user at said user device and a specific sensor employed at said user device to authenticate the user; (e) determining, by the computing device, the length of relationship sub score for each of the multiple user devices based on a length of a relation between the user and said user device for which the sub score is calculated; (f) determining, by the computing device, the historical consistency sub score for each of the user devices based on a consistency of the data for said user device over a predetermined interval; and (g) identifying the user devices, in response to the request, based on a user profile for the user in a data structure.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in verifying network identities, the method comprising:
   receiving, at a computing device, data associated with multiple user devices of a user, each of the multiple user devices associated with one or more identity attributes of the user;
   receiving, at the computing device, a request for authentication of the user based on the one or more identity attributes;
   in response to the request for authentication of the user, generating an aggregate score based on a length of relationship sub score for each of the multiple user devices and at least one of: a reliability sub score and a historical consistency sub score for each of the multiple user devices, the length of relationship sub score for each of the multiple user devices indicative of a length of time of a relationship between the user and each of the multiple user devices; and
   transmitting the aggregate score to a relying party in response to the request, thereby permitting the relying party to authenticate the user based at least in part on the aggregate score.

2. The computer-implemented method of claim 1, further comprising determining, by the computing device, the reliability sub score for each of the multiple user devices based on a type of authentication of the user at said user device and a specific sensor employed at said user device to authenticate the user.

3. The computer-implemented method of claim 1, further comprising determining, by the computing device, the historical consistency sub score for each of the user devices based on a consistency of the data for said user device over a predetermined interval.

4. The computer-implemented method of claim 3, wherein determining the historical consistency sub score includes determining the historical consistency sub score based on a number of login failures at the user device over the predetermined interval.

5. The computer-implemented method of claim 1, further comprising identifying the user devices, in response to the request, based on a user profile for the user in a data structure.

6. The computer-implemented method of claim 5, wherein the user devices are selected from a communication device, a smart watch, and a smart device at a residence associated with the user.

7. The computer-implemented method of claim 5, further comprising:
   transmitting, by the computing device, an authentication command to at least one of the user devices requesting an authentication input for the user; and
   receiving, from said at least one of the user devices, a command reply indicating an authentication result for the user at the at least one of the user devices, prior to transmitting the aggregate score to the relying party.

8. The computer-implemented method of claim 7, wherein receiving the data associated with the multiple user devices includes receiving at least some of said data from the at least one of the user devices via the command reply.

9. The computer-implemented method of claim 1, further comprising:
   determining, by the computing device, the reliability sub score for each of the multiple user devices based on a type of authentication of the user at said user device and a specific sensor employed at said user device to authenticate the user;
   determining, by the computing device, the length of relationship sub score for each of the multiple user devices based on a length of a relation between the user and said user device for which the sub score is calculated; and
   determining, by the computing device, the historical consistency sub score for each of the user devices based on a consistency of the data for said user device over a predetermined interval.

10. A system for use in verifying network identities, the system comprising at least one computing device configured to:
   receive data associated with multiple user devices of a user and relating to one or more identity attributes of the user;
   receive a request for authentication of the user;
   in response to the request for authentication of the user:
      identify at least one of the multiple user devices;

submit an authentication command to the user to the identified at least one of the multiple user devices; and in response to a command reply from the identified at least one of the multiple user devices indicating user authentication, generate an aggregate score based on a length of relationship sub score for each of the multiple user devices and at least one of: a reliability sub score and a historical consistency sub score for each of the multiple user devices, the length of relationship score for each of the multiple user devices indicative of a length of time of a relationship between the user and each of the multiple user devices; and transmit the aggregate score to a relying party, thereby permitting the relying party to authenticate the user based at least in part on the aggregate score.

11. The system of claim 10, wherein the at least one computing device is configured to identify the at least one of the multiple user devices based on a user profile for the user in a data structure.

12. The system of claim 11, wherein the user devices are selected from a group including a communication device, a smart watch, and a smart device at a residence associated with the user.

13. The system of claim 10, wherein the at least one computing device is further configured to:

determine the reliability sub score for each of the multiple user devices based on a type of authentication of the user at said user device and a specific sensor employed at said user device to authenticate the user; and determine the historical consistency sub score for each of the user devices based on a consistency of the data for said user device over a predetermined interval.

14. A non-transitory computer-readable storage medium comprising executable instructions for use in verifying network identities, which when executed by at least one processor, cause the at least one processor to:

receive data associated with multiple user devices of a user and relating to one or more identity attributes of the user;

determine a reliability sub score for each of the multiple user devices based on a type of authentication of the user at said user device and a specific sensor employed at said user device to authenticate the user;

determine a length of relationship sub score for each of the multiple user devices based on a length of a relation between the user and said user device for which the sub score is calculated;

determine a historical consistency sub score for each of the user devices based on a consistency of the data for said user device over a predetermined interval;

generate an aggregate score based on the reliability sub score, the length of relationship sub score, and the historical consistency sub score for each of the multiple user devices; and in response to a request for authentication of the user, transmit the aggregate score to a relying party, thereby permitting the relying party to authenticate the user based at least in part on the aggregate score.

15. The non-transitory computer-readable storage medium of claim 14, wherein the executable instructions, when executed by the at least one processor, further cause the at least one processor to identify the user devices, in response to the request, based on a user profile for the user in a data structure.

16. The non-transitory computer-readable storage medium of claim 14, wherein the executable instructions, when executed by the at least one processor, further cause the at least one processor to:

transmit an authentication command to at least one of the user devices requesting an authentication input for the user; and receive, from said at least one of the user devices, a command reply indicating an authentication result for the user at the at least one of the user devices.

17. The non-transitory computer-readable storage medium of claim 16, wherein the executable instructions, when executed by the at least one processor, further cause the at least one processor, in connection with receiving the data associated with the multiple user devices, to receive at least some of said data from the at least one of the user devices via the command reply.

\* \* \* \* \*